(12) United States Patent
Park et al.

(10) Patent No.: US 11,709,486 B2
(45) Date of Patent: Jul. 25, 2023

(54) FAULT SIGNAL RECOVERY SYSTEM AND METHOD

(71) Applicant: DOOSAN ENERBILITY CO., LTD., Changwon-si (KR)

(72) Inventors: Jee Hun Park, Gwangmyeong-si (KR); Hyun Sik Kim, Gimpo-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 310 days.

(21) Appl. No.: 17/142,219

(22) Filed: Jan. 5, 2021

(65) Prior Publication Data

US 2021/0157308 A1    May 27, 2021

Related U.S. Application Data

(63) Continuation of application No. 15/949,088, filed on Apr. 10, 2018, now Pat. No. 10,915,097.

(30) Foreign Application Priority Data

May 15, 2017    (KR) .................. 10-2017-0059963

(51) Int. Cl.
  *G05B 23/02*    (2006.01)
  *G06N 20/00*    (2019.01)
  *G06N 20/20*    (2019.01)

(52) U.S. Cl.
  CPC ..... *G05B 23/0259* (2013.01); *G05B 23/0221* (2013.01); *G06N 20/00* (2019.01); *G06N 20/20* (2019.01)

(58) Field of Classification Search
  None
  See application file for complete search history.

(56) References Cited

U.S. PATENT DOCUMENTS

| | | | |
|---|---|---|---|
| 5,909,331 A | 6/1999 | Behrens et al. | |
| 2007/0027656 A1* | 2/2007 | Baraniuk | G06K 9/6232 702/189 |
| 2009/0052317 A1* | 2/2009 | Takagi | H04L 41/0654 370/258 |
| 2013/0088952 A1 | 4/2013 | Balasubramanian et al. | |
| 2013/0226850 A1* | 8/2013 | Hannuksela | G06F 16/58 706/14 |
| 2013/0315475 A1 | 11/2013 | Song et al. | |

(Continued)

*Primary Examiner* — Arleen M Vazquez
*Assistant Examiner* — Brandon J Becker
(74) *Attorney, Agent, or Firm* — Harvest IP Law, LLP

(57) ABSTRACT

Disclosed is a fault signal recovery system including a data processor configured to generate a signal subset U* by removing, from a signal set U for a plurality of tags, some tags including a fault signal, and a first learning signal subset X* by removing tags disposed at positions corresponding to the some tags from a learning signal set X containing only tags of normal signals, a modeling unit configured to generate feature information F extractable from the first learning signal subset X* and recovery information P on a plurality of recovery models usable for restoring the fault signal, and a recovery unit configured to estimate and recover normal signals for the some tags based on the signal subset U*, the first learning signal subset X*, the feature information F, the recovery information P on the plurality of recovery models, and similarity Z.

18 Claims, 9 Drawing Sheets

(56) References Cited

U.S. PATENT DOCUMENTS

| | | | | |
|---|---|---|---|---|
| 2013/0346347 | A1* | 12/2013 | Patterson | H04M 1/72454 706/12 |
| 2014/0258187 | A1* | 9/2014 | Suleiman | G06F 11/3447 706/12 |
| 2015/0347519 | A1* | 12/2015 | Hornkvist | G06F 16/2457 707/722 |

* cited by examiner

[FIG. 1]
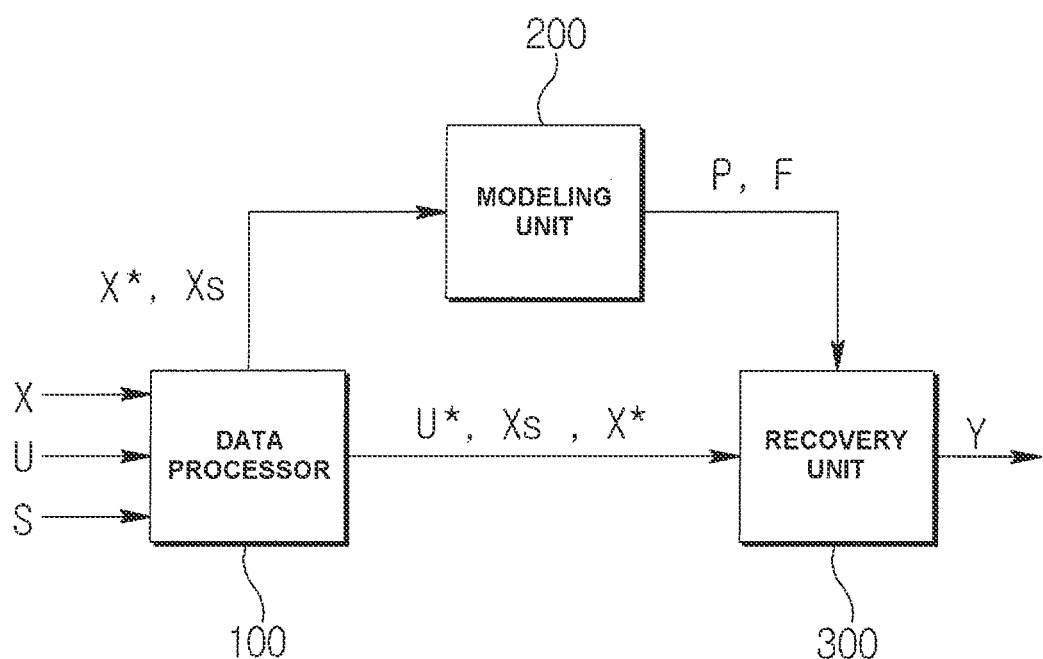

[FIG. 2]
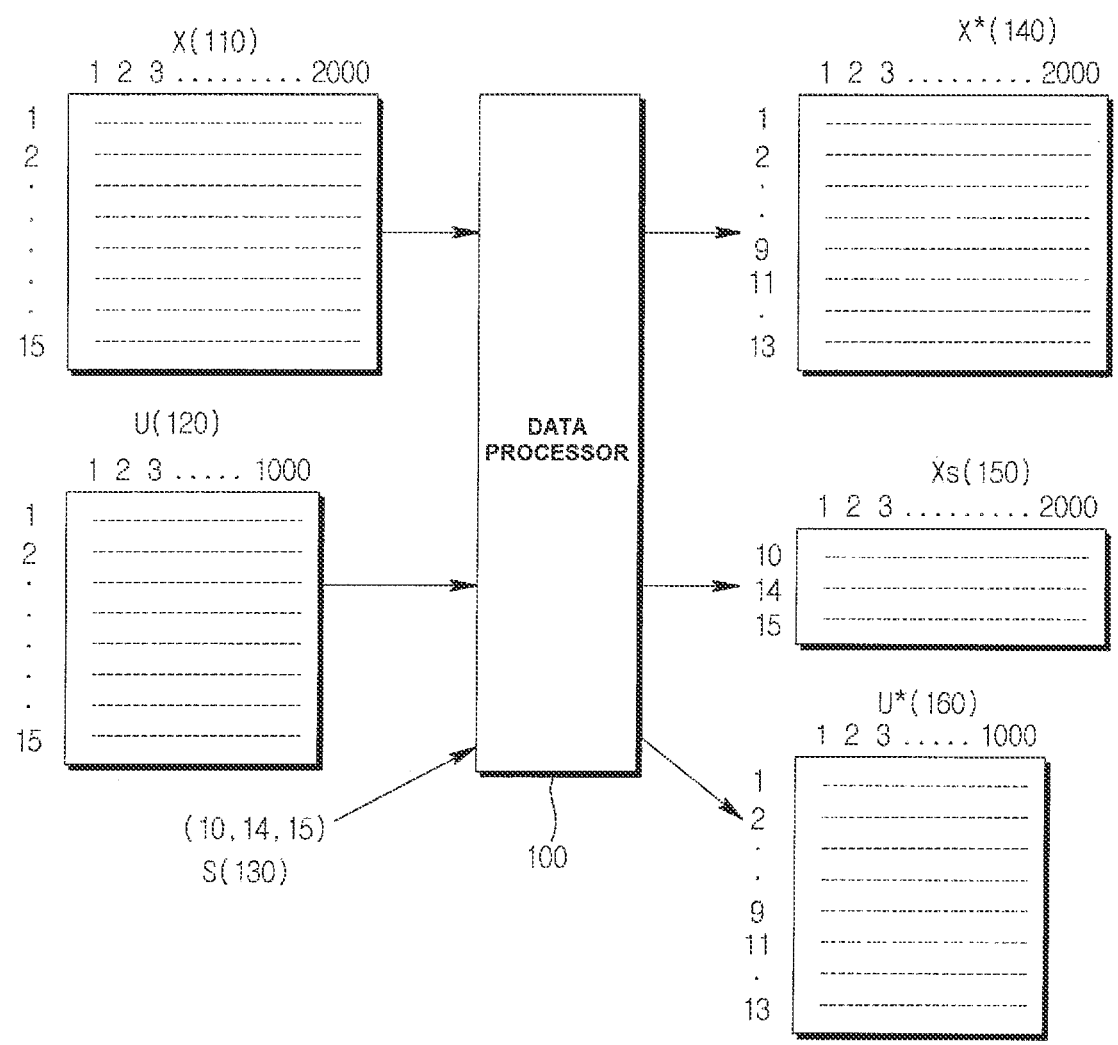

[FIG. 3]
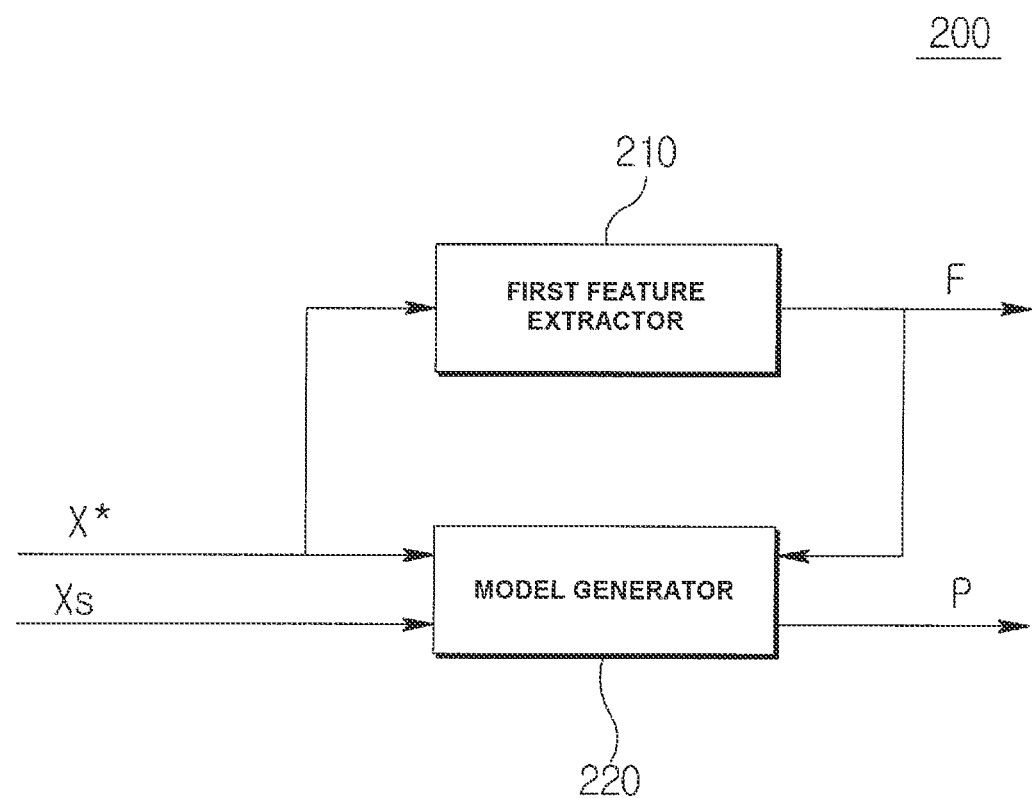

[FIG. 4]
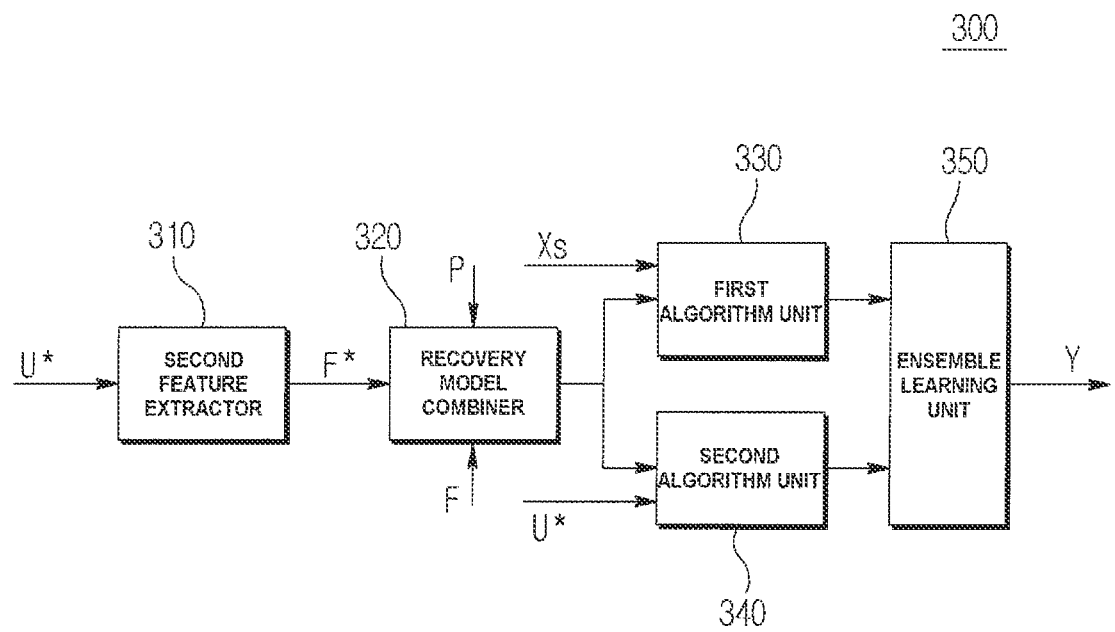

[FIG. 5]
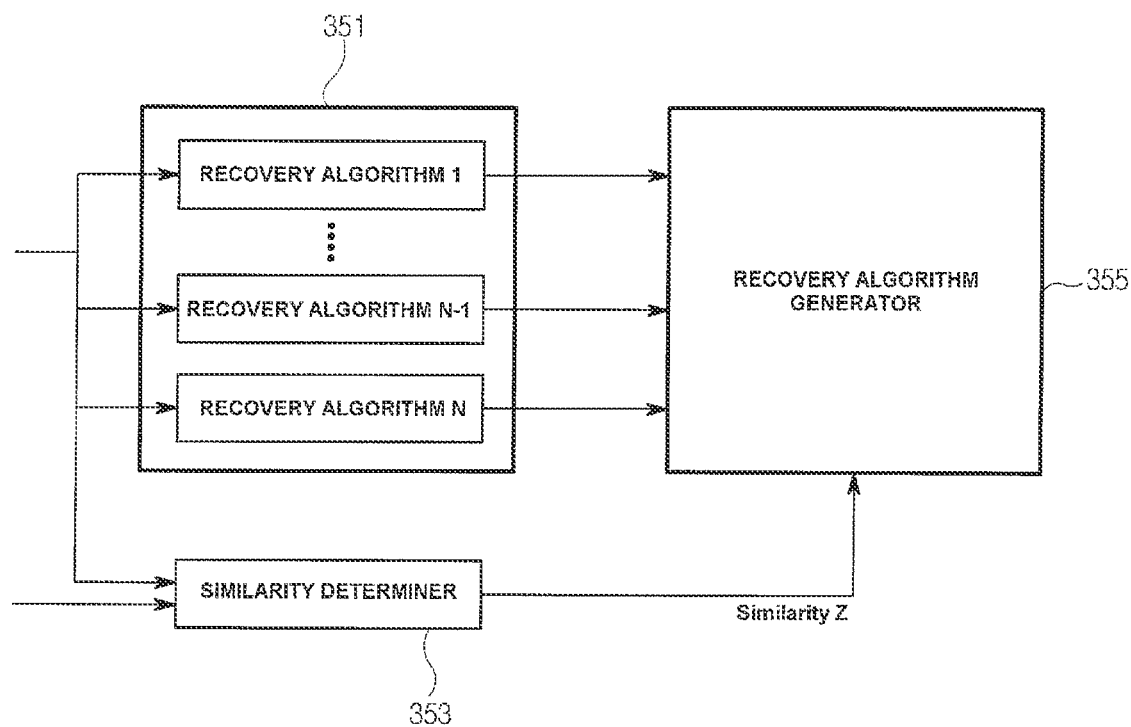

[FIG. 6]
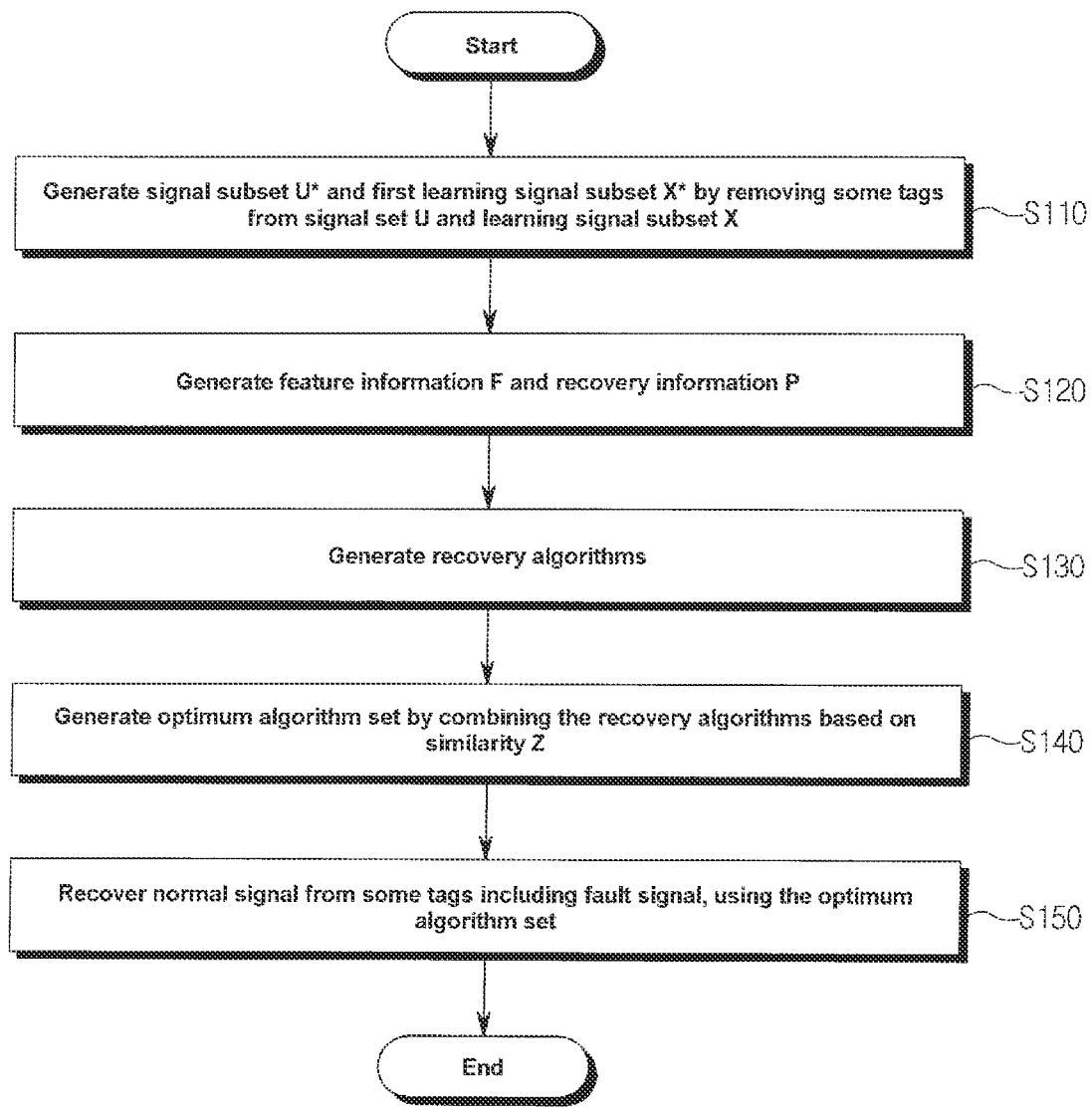

[FIG. 7]
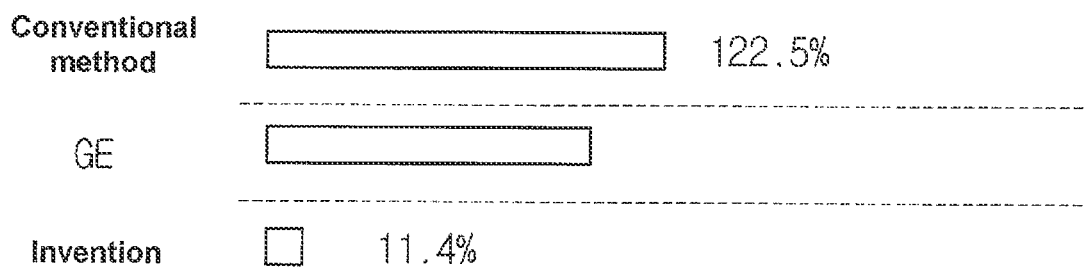

[FIG. 8]
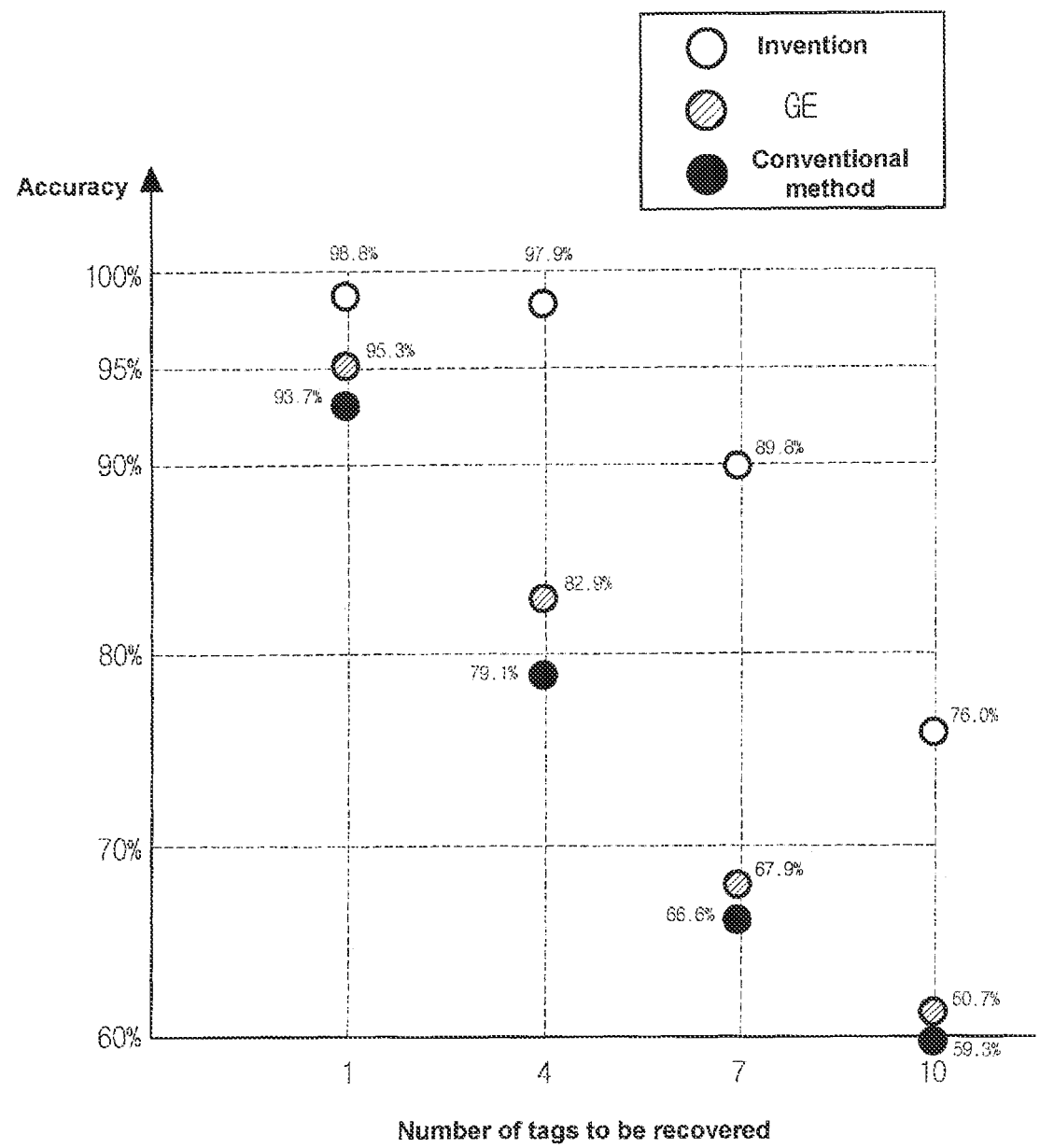

[FIG. 9]
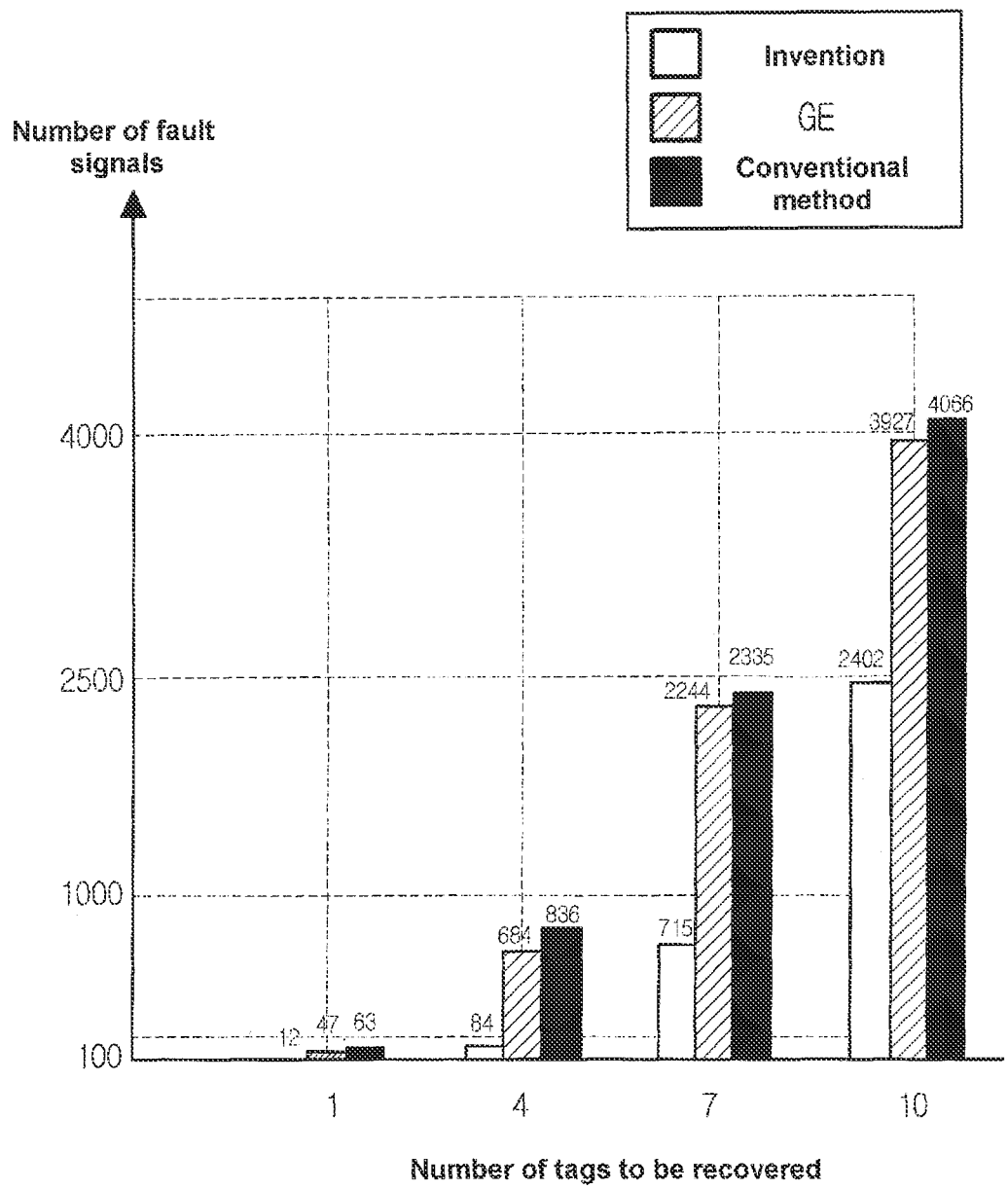

FAULT SIGNAL RECOVERY SYSTEM AND METHOD

CROSS-REFERENCE TO RELATED APPLICATIONS

This application is a continuation of U.S. application Ser. No. 15/949,088, filed on Apr. 10, 2018, which claims priority to Korean Patent Application No. 10-2017-0059963 filed on May 15, 2017, the disclosure of which is incorporated herein by reference in its entirety.

BACKGROUND OF THE DISCLOSURE

Field of the Disclosure

The present disclosure relates to collecting signals obtained through measurement of a plant and restoring a fault signal present among the measured signals, and more particularly, to a fault signal recovery system and method for restoring a fault signal to a normal signal using a parameter related to similarity.

Description of the Related Art

Generally, large plants such as power plants or chemical plants are operated with various kinds of hundreds of machines and electric components in complex connection with each other. Such plants must constantly monitor signs of faults, which lead to an accident, in order to secure reliability and to supply power stably. Accordingly, a monitoring device has been introduced to detect, in real time, whether major components constituting the plant are damaged or not and to generate an alarm to the operator when signs of faults in the components are found.

That is, a failure of a plant can cause a damage to the plant, leading to undesirable performance. Further, as a result of the plant failure, a person could be injured or killed and environmental problems may arise. Therefore, an early warning system capable of early detection of faults is indispensable.

An early warning system that provides an early indication of a failure or likelihood of a failure is required to receive and store real-time observation signals from the plant and to identify a fault signal beforehand based on the stored signals. Therefore, the most important part in such a failure detection system may be a failure prediction model capable of early failure prediction. The failure prediction model may accurately predict the normal state of the plant and predict an occurrence of a failure when an observation signal that is different from the normal state is entered.

In order for the failure prediction model to operate as accurately as it can, good-quality learning data is needed. In other words, accuracy of the failure prediction model may be improved by performing learning of a normal state using good-quality learning data. Therefore, securing the good-quality learning data is a top priority for accurate failure prediction models. Although most observed signals are well suited as learning data, some sensors provide fault signals due to a sensor failure or network problems as well as an actual plant failure. Generally, data containing such a fault signal cannot be used as the learning data. However, in some cases, it may be inappropriate to discard other good-quality data because of some fault signals. In this case, if the fault signals can be restored to the original normal signals, all the data may be used as the learning data.

Such fault signal recovery technology is considered as a technology that is essential for an early warning system. In addition, since signals recovered through the fault signal recovery technology can be used as the learning data to construct the failure prediction model, very accurate recovery of the signals is necessary to construct an accurate failure prediction model. However, accuracy of the fault signal recovery technology is still low, and thus there is a need in the technology area to increase the accuracy.

SUMMARY OF THE DISCLOSURE

Therefore, the present disclosure has been made in view of the above problems, and it is an object of the present disclosure to provide a fault signal recovery system and method for generating a highly reliable recovery algorithm through a parameter of similarity and restoring a fault signal therethrough.

In accordance with an aspect of the present disclosure, the about and other objects can be accomplished by the provision of a fault signal recovery system. The fault signal recovery system includes a data processor configured to generate a signal subset $U^*$ by removing, from a signal set U for a plurality of tags, some tags including a fault signal, and a first learning signal subset $X^*$ by removing tags disposed at positions corresponding to the some tags from a learning signal set X containing only tags of normal signals, a modeling unit configured to generate feature information F extractable from the first learning signal subset $X^*$ and recovery information P on a plurality of recovery models usable for restoring the fault signal, and a recovery unit configured to estimate and recover normal signals for the some tags based on the signal subset $U^*$, the first learning signal subset $X^*$, the feature information F, the recovery information P on the plurality of recovery models, and similarity Z, the similarity Z being a parameter indicating a degree of similarity between the signal subset $U^*$ and the first learning signal subset $X^*$.

According to an embodiment, the recovery unit may include a model selector configured to select at least one recovery algorithm based on the signal subset $U^*$, the first learning signal subset $X^*$, the feature information F, and the recovery information P, a similarity determiner configured to derive the similarity Z between the signal subset $U^*$ and the first learning signal subset $X^*$, and a recovery algorithm generator configured to generate an optimum recovery algorithm by applying the similarity Z to the at least one recovery algorithm.

According to an embodiment, the recovery algorithm generator may generate the optimum recovery algorithm by combining the at least one recovery algorithm according to a value of the similarity Z.

According to an embodiment, the similarity determiner may determine that the signal subset $U^*$ and the first learning signal subset $X^*$ are similar to each other as a value of the similarity Z increases.

According to an embodiment, the optimum recovery algorithm may be configured as a set formed by combining the at least one recovery algorithm according to a plurality of cases obtained by comparing values of a plurality of preset parameters with a value of the similarity Z.

According to an embodiment, the at least one recovery algorithm may include a plurality of recovery algorithms each formed by combining an algorithm and a recovery model, wherein the algorithm or recovery model applied for any one of the recovery algorithms may different from the algorithms or recovery models applied for the other ones of the recovery algorithms.

According to an embodiment, the optimum recovery algorithm may be a combination of at least one of a recovery algorithm using a parametric model and a recovery algorithm using a nonparametric model in each of the plurality of cases.

According to an embodiment, the signal subset U* and the first learning signal subset X* may be configured as n×m matrices, wherein the similarity Z may be defined as:

$$\zeta_j = 1 - \frac{\sum_{i=1}^{n-ns} \left| \frac{X_{i,j}^* - U_i^*}{X_{i,j}^* + \alpha} \right|}{n - ns}, \quad j = 1, 2, \ldots, m, \text{ and}$$

$$Z = \max(\zeta_1, \ldots \zeta_m),$$

where α may be a very small positive value and ns may be the number of tags to be recovered.

According to an embodiment, the data processor may further generate a second learning signal subset Xs containing only signals for the some tags and the first learning signal subset X* containing only signals for the remaining tags other than the some tags by processing the learning signal set X.

According to an embodiment, the modeling unit may include a feature extractor configured to extract the feature information F extractable from the first learning signal subset X* received from the data processor, and a model generator configured to generate the recovery information P on the plurality of recovery models usable for restoring the fault signal based on the first learning signal subset X* and the second learning signal subset Xs received from the data processor and the feature information F.

In accordance with another aspect of the present disclosure, provided is a fault signal recovery method. The method includes generating a signal subset U* by removing, from a signal set U for a plurality of tags, some tags including a fault signal, and a first learning signal subset X* by removing tags disposed at positions corresponding to the some tags from a learning signal set X containing only tags of normal signals, generating feature information F extractable from the first learning signal subset X* and recovery information P on a plurality of recovery models usable for restoring the fault signal, generating recovery algorithms based on the signal subset U*, the first learning signal subset X*, the feature information F, and the recovery information P on the plurality of recovery models, generating an optimum recovery algorithm set by combining the recovery algorithms based on similarity Z, the similarity Z being a parameter indicating a degree of similarity between the signal subset U* and the first learning signal subset X*, and estimating and recovering normal signals for the some tags through the optimum recovery algorithm set.

According to an embodiment, the generating of the optimum recovery algorithm set may include combining the recovery algorithms based on a plurality of cases obtained by comparing value of a plurality of preset parameters with a value of the similarity Z.

According to an embodiment, the optimum recovery algorithm set may be a combination of at least one of a recovery algorithm using a parametric model and a recovery algorithm using a nonparametric model in each of the plurality of cases.

According to an embodiment, the signal subset U* and the first learning signal subset X* may be configured as n×m matrices, wherein the similarity Z may be defined as:

$$\zeta_j = 1 - \frac{\sum_{i=1}^{n-ns} \left| \frac{X_{i,j}^* - U_i^*}{X_{i,j}^* + \alpha} \right|}{n - ns}, \quad j = 1, 2, \ldots, m, \text{ and}$$

$$Z = \max(\zeta_1, \ldots \zeta_m),$$

where α may be a very small positive value and ns may be the number of tags to be recovered.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram illustrating a fault signal recovery system according to an embodiment of the present disclosure;

FIG. 2 is a block diagram illustrating a data processor according to an embodiment of the present disclosure;

FIG. 3 is a block diagram illustrating a modeling unit according to an embodiment of the present disclosure;

FIG. 4 is a block diagram illustrating a recovery unit according to an embodiment of the present disclosure;

FIG. 5 is a block diagram illustrating an ensemble learning unit according to an embodiment of the present disclosure;

FIG. 6 is a flowchart illustrating a fault signal recovery method according to an embodiment of the present disclosure;

FIG. 7 shows a result of simulation obtained on the assumption of recovery of corresponding sensor data in a situation where sensor data #2, #14, and #15 out of 15 sensor (tag) data have not been acquired;

FIG. 8 is a diagram showing the accuracy of recovery when the number of signals (tags) to be recovered increases to 1, 4, 7, and 10; and FIG. 9 is a diagram showing the number of fault signals remaining even after the recovery operation when the number of signals (tags) to be recovered increases to 1, 4, 7, and 10.

DETAILED DESCRIPTION OF THE DISCLOSURE

The advantages and features of the present disclosure and the manner of achieving the same will become apparent from the embodiments described in detail below with reference to the accompanying drawings. The present disclosure may, however, be embodied in many different forms and should not be construed as limited to the embodiments set forth herein. It should be understood that these embodiments are provided such that the disclosure will be thorough and complete, and will fully convey the concept of the disclosure to those skilled in the art. The scope of the disclosure is only defined by the claims. Wherever possible, the same reference numerals will be used to refer to the same or like parts.

FIG. 1 is a block diagram illustrating a fault signal recovery system according to an embodiment of the present disclosure.

Referring to FIG. 1, the fault signal recovery system according to the present disclosure includes a data processor 100, a modeling unit 200, and a recovery unit 300.

The data processor 100 may process a plurality of types of data to restore a fault signal. For example, the data processor 100 may include a signal set U including a fault signal, a learning signal set X including only normal signals, and an input S including information on a tag to be recovered. Specifically, the signal set X represents the learning data used to build an existing failure prediction model and may include only normal signals. The signal set U may be data including tags to be recovered where the tags relate to fault signals. Some of the tags in the signal set U may be data containing fault signals, and the learning signal set X may be learning data for restoring some tags including the fault signals included in the signal set U to normal signals. The input S may be an input containing information about tags to be recovered. In an embodiment of the present disclosure, a tag may refer to a type of signal that may be measured in the plant. As an example, the tag may represent not only the signal types, such as the differential pressure of an inlet filter, a turbine exhaust pressure and a temperature that may be directly acquired from the plant using sensors, but also a value such as output power that is calculated based on a signal acquired using a sensor in the system.

The data processor 100 may generate a first learning signal subset X*, a second learning signal subset Xs, and a signal subset U* upon receiving the learning signal set X, the signal set U, and the input S. The signal subset U* may include only signals obtained by removing some tags including the fault signal, and the first learning signal subset X* may include only signals obtained by removing tags disposed at positions corresponding to the some tags. That is, the first learning signal subset X* may include only signals corresponding to the tags other than the tags to be recovered in the learning signal set X.

The modeling unit 200 may be a module configured to generate a model for restoring a fault signal. The modeling unit 200 may receive the first learning signal subset X* and the second learning signal subset Xs generated by the data processor 100 and analyze the same. The modeling unit 200 may extract feature information F including feature information and recovery information P about a plurality of recovery models usable for signal recovery from the first learning signal subset X* and the second learning signal subset Xs.

The recovery unit 300 may estimate and recover a normal signal from the fault signal included in the signal set U based on the signal subset U*, the first learning signal subset X*, and the second learning signal subset Xs, which are received from the data processor 100, as well as the feature information F and the recovery information P, which are received from the modeling unit 200.

FIG. 2 is a block diagram illustrating a data processor according to an embodiment of the present disclosure. FIG. 2 shows that the data processor 100 receives the learning signal set X, the signal set U, and the input S, and generates the first learning signal subset X*, the second learning signal subset Xs, and the signal subset U*.

Referring to FIG. 2, both the input and the output of the data processor 100 may be presented in a matrix form. The learning signal set X (110) represents learning data used to construct an existing failure prediction model, and each row thereof may be a type of a signal measured in the plant, that is, a tag. Each column shows values of respective tags in temporal order. As an example, a signal may be acquired every five minutes through each sensor, and the acquired values may be presented in a column of tags. Then, the signal set X (110) of FIG. 2, which is a 15×2000 matrix, presents values acquired 2000 times (7 days in time) for each of the 15 signal types. Here, the signal set X (110) is a set conventionally used to construct the existing failure prediction model, and all values in the matrix may include normal values.

The signal set U 120 may be newly measured data. For example, one signal value may be acquired for 15 tags every 5 minutes during a period of about 3.5 days to generate the signal set U (120). As a result of the failure prediction performed based on the acquired signal set U (120), it was found that tags #10, #14 and #15 of the signal set U (120) are not normal signals. This issue may be raised a sensor does not operate when a fault occurs in the plant, or there is a problem with a network for transmitting the observed signal value. A problem with a particular tag may be estimated via the input S (130).

The signal set U (120) has normal signals for twelve tags out of the fifteen tags, but has fault signals for three tags. In this case, conventionally, the entirety of the signal set U 120 should be discarded, and the data collected for 3.5 days will disappear, which may lead to inefficiency in generating and executing a failure prediction model. In this regard, in order to eliminate such inefficiency, the present disclosure may restore a tag having a fault signal so as to have a normal signal and allow the signal set U (120) to be used for learning data, thereby preventing waste of the collected data and enhancing efficiency in generating a failure prediction model. That is, the signal set U (120) may be regarded as data including a fault signal, that is, a tag to be restored.

The input S (130) includes information on a tag that contains fault data which needs to be restored. In the example of FIG. 2, the tags #10, #14, and #15 among the tags of the signal set U (120) have fault signals.

The data processor 100 may receive the learning signal set X, the signal set U, and the input S, and then generate the first learning signal subset X*, the second learning signal subset Xs, and the signal subset U*. The first learning signal subset X* (140) may include only signals corresponding to the remaining tags (hereinafter referred to as a second tag group) other than the tags to be restored in the signal set X (110). The signal subset U* (160) may include only signals corresponding to the second tag group in the signal set U (120). That is, in the example of FIG. 2, a 12×2000 matrix formed by excluding the tenth, fourteenth, and fifteenth rows, which are the signal tags to be restored, from the learning signal set X (110), may become the first learning signal subset X* (140), and a 12×1000 matrix formed by excluding the tenth, fourteenth, and fifteenth rows, which are the signal tags to be restored, from the signal set U (120) may become the signal subset U* (160). The second learning signal subset Xs (150) may include only signals corresponding to the tags (first tag group) to be restored in the learning signal set X (110). That is, in the example of FIG. 2, the second learning signal subset Xs (150) is a 3×2000 matrix having data of the tenth, fourteenth, and fifteenth rows. The first learning signal subset X*, the second learning signal subset Xs, and the signal subset U* output from the data processor 100 may be input to and used by the modeling unit 200 and the recovery unit 300.

While it is illustrated in the embodiment described above that the learning signal set X can be divided into the first learning signal subset X* and the second learning signal subset Xs by the data processor 100, a function may be performed in other parts of the fault signal recovery system using the learning signal set X that has not been processed by the data processor 100.

FIG. 3 is a block diagram illustrating a modeling unit according to an embodiment of the present disclosure.

Referring to FIGS. 1 and 3, the modeling unit 200 may include a first feature extractor 210 and a model generator 220. The modeling unit 200 may function to generate a model for restoring a fault signal of the first tag group. The modeling unit 200 may receive the first learning signal subset X* and the second learning signal subset Xs generated by the data processor 100, and output feature information F including the feature information extracted from the subsets and recovery information P on a plurality of recovery models usable for fault signal recovery.

The first feature extractor 210 may extract features included in the data based on the first learning signal subset X*. The first feature extractor 210 may extract the features using only data of one specific tag or may extract the features by combining data of all the tags included in the first learning signal subset X* or data of some of the tags. In this case, the extracted feature information F may indicate whether an electric generator is in the starting state or is operating in a normal state, and may indicate whether the season in which the data is collected is spring, summer, autumn or winter. It may also indicate a specific weather. In addition, the first feature extractor 210 is not limited to the above-described examples, and may extract various features that may be obtained from the data generated in the plant.

The model generator 220 may generate a plurality of various models. These models may be nonparametric models or may be parametric models. That is, the model generator 220 may generate a plurality of nonparametric models and parametric models based on the feature information F extracted by the first feature extractor 210, using the first learning signal subset X* and the second learning signal subset Xs received from the data processor 100.

The parametric models may be models that represent the system using a finite number of parameters. That is, the parametric models may describe the system using a limited number of parameters. The parametric models may include a first principles based model, a transfer function model, and a state space model. Here, the first principles based model may be a model that uses factors determined according to the first law of physics, which is basic and fundamental, as parameters. The state space model may be a model that uses state variables as parameters. The transfer function model may be a model that uses variables defining a transfer function between input and output as parameters. Here, the transfer function model may include an ARX (Auto Regressive Exogenous) model, a NARX (Nonlinear Auto Regressive Exogenous) model, an FIR (Finite Impulse Response) model, and an ARMAX (Auto Regressive Moving Average with Exogenous) model.

The nonparametric models are models that can use an infinite number of parameters to represent a plant and may include a Non-Parametric Model (NPM), a Tree Model (TM), and a Neural Network Model (NNM). The nonparametric models may conceptually use an infinite number of parameters, but use only a finite number of models in reality.

The model generator 220 may determine parameters that optimize each of one or more parametric models and each of one or more nonparametric models using the first learning signal subset X* and the second learning signal subset Xs based on the features extracted by the first feature extractor 210. The parameters determined by the model generator 220 may be included in the recovery information P. The recovery information P may include a plurality of optimized parametric and/or nonparametric models and parameter information to be used in each model.

According to an embodiment of the present disclosure, as the recovery information P on a plurality of recovery models is generated by the modeling unit 200 on the basis of the feature information F, reliability of recovery of the fault signals may be further enhanced.

FIG. 4 is a block diagram illustrating a recovery unit according to an embodiment of the present disclosure.

Referring to FIGS. 1, 3 and 4, the recovery unit 300 may estimate and recover normal signals for some tags including a fault signal, based on the signal subset U*, the first learning signal subset X*, the feature information F, the recovery information P on the plurality of recovery models, and similarity Z, which is a parameter indicating the degree of similarity between the signal subset U* and the first learning signal subset X*. The recovery unit 300 may include a second feature extractor 310, a recovery model combiner 320, a first algorithm unit 330, a second algorithm unit 340, and an ensemble learning unit 350.

The second feature extractor 310 may extract partial feature information F* included in the data of the signal subset U*. The criterion and logic of the feature extraction used by the second feature extractor 310 to extract features may be the same as the criterion and logic used by the first feature extractor 210 of FIG. 3.

The recovery model combiner 320 may select optimum recovery models to be used for recovery, based on the feature information F and the recovery information P, which are generated by the modeling unit 200, and the partial feature information F* on the signal subset U*, which is extracted by the second feature extractor 310. As an example, the recovery model combiner 320 may select at least one nonparametric model and at least one parametric model. In selecting the optimum recovery models, the combiner 320 may compare the feature information F extracted by the first feature extractor 210 of the modeling unit 200 with the partial feature information F* extracted by the second feature extractor 310 of the recovery unit 300 to find similar regions and select recovery models that generate similar features in the similar regions as the optimum recovery models.

The first algorithm unit 330 may generate an algorithm-based recovery algorithm. The first algorithm unit 330 may generate the algorithm-based recovery algorithm by combining algorithms suitable for the optimum recovery models selected by the recovery model combiner 320. Through the algorithm-based recovery algorithm, the recovery unit 300 may maximize the expression capability of the recovery models and minimize the influence of data about a specific tag on data about the other tags. The algorithm-based recovery algorithm may be, for example, a k-Nearest Neighbor (k-NN)-based recovery algorithm.

The second algorithm unit 340 may generate a model-based recovery algorithm. The second algorithm unit 340 may generate the model-based recovery algorithm by combining algorithms suitable for the optimum recovery models selected by the recovery model combiner 320. Through the model-based recovery algorithm, the recovery unit 300 may overcome the disadvantage of the algorithm-based recovery technique and improve versatility. The model-based recovery algorithm may be, for example, a Multiple Linear Regression Model (MLRM)-based recovery algorithm.

Unlike the example described above, the first algorithm unit 330 may generate a parametric model-based algorithm, and the second algorithm unit 340 may generate a nonparametric model-based algorithm. However, the first algorithm unit 330 and the second algorithm unit 340 may generate recovery algorithms whose characteristics are different from each other. The first algorithm unit 330 and the second algorithm unit 340 may generate the recovery algorithms each having an advantage and a disadvantage.

The ensemble learning unit 350 may extract a plurality of recovery algorithms based on the recovery values determined by the first algorithm unit 330 and the second algorithm unit 340 and similarity Z, which is a parameter indicating the degree of similarity between the signal subset U* and the first learning signal subset X*. Ensemble learning refers to using multiple learning algorithms to achieve better performance than when the algorithms are used separately. In the present disclosure, a plurality of recovery models whose characteristics are different from each other and a plurality of recovery algorithms whose characteristics are different from each other are selected in order to increase the accuracy of the recovery values, and ensemble learning is used to estimate an optimum recovery value based on the recovery values estimated through the plurality of recovery algorithms and similarity Z, which is a parameter. That is, the ensemble learning unit 350 may extract the advantages of each of the recovery algorithms extracted by the first algorithm unit 330 and the second algorithm unit 340 and supplement the disadvantages thereof to generate optimum recovery algorithms. Similarity Z will be described later.

The ensemble learning unit 350 may use various algorithmic techniques to estimate the most accurate recovery value based on the recovery values estimated by the first algorithm unit 330 and the second algorithm unit 340. The algorithmic techniques may include bagging based on majority vote without multiplying each recovery value by a weight or boosting for estimating the accurate value by multiplying a predicted value estimated by each prediction model by a weight and adding the weighted values.

FIG. 5 is a block diagram illustrating an ensemble learning unit according to an embodiment of the present disclosure.

Referring to FIGS. 1, 4 and 5, the ensemble learning unit 350 may include a model selector 351, a similarity determiner 353, and a recovery algorithm generator 355.

The model selector 351 may select recovery algorithms to be used to generate an optimum recovery algorithm among the plurality of recovery algorithms generated by the first algorithm unit 330 and the second algorithm unit 340. In other words, the model selector 351 may select a plurality of recovery algorithms based on the feature information F and the recovery information P, which are input from the modeling unit 200, and the signal subset U* and the first learning signal subset X*, which are received from the data processor 100. A recovery algorithm is a combination of an algorithm and a recovery model. A different algorithm or a different recovery model may be applied for each of the plurality of recovery algorithms.

The similarity determiner 353 may derive a parameter called similarity Z to determine the degree of similarity between the signal subset U* and the first learning signal subset X*. For example, the signal subset U* and the first learning signal subset X* may be configured as n×m matrices, and similarity Z may be calculated by the following equation:

$$\zeta_j = 1 - \frac{\sum_{i=1}^{n-ns} \left| \frac{X^*_{i,j} - U^*_i}{X^*_{i,j} + \alpha} \right|}{n - ns}, \quad j = 1, 2, \ldots, m, \text{ and}$$

$$Z = \max(\zeta_1, \ldots \zeta_m).$$

Here, α is a very small positive value and ns is the number of tags to be restored. If $\zeta_j$ is 1, the signal subset U* and the learning signal subset X* may be determined to be identical. If $\zeta_j$ is less than or equal to 0, $\zeta_j$ may be determined to be 0. As the value of similarity Z increases, it may be determined that the signal subset U* and the first normal signal subset X* are similar to each other. As the value decreases, it may be determined that the signal subset U* and the first normal signal subset X* are less similar to each other.

The recovery algorithm generator 355 may apply similarity Z to a plurality of recovery algorithms to generate an optimum recovery algorithm. That is, it may generate a recovery algorithm set by combining a plurality of recovery algorithms. That is, the recovery algorithm generator 355 may serve to generate an optimum recovery algorithm by combining at least one recovery algorithm according to the value of similarity Z between the signal subset U* and the first learning signal subset X*. For example, the recovery algorithm generator 355 may generate an optimum recovery algorithm by combining a nonparametric model-based recovery algorithm $Y_{NPM}$ and a parametric model-based recovery algorithm $Y_{PM}$. Here, $Y_{NPM}$ may be a k-NN-based recovery algorithm, and $Y_{PM}$ may be an MLRM-based recovery algorithm. In the following equation, Y may denote an optimum algorithm set.

$$Y = \begin{cases} Y_{NPM} & \text{if } Z > \varepsilon_1 \\ (1 - \varepsilon_1) \times Y_{NPM} + \varepsilon_1 Y_{PM} & \text{if } \varepsilon_2 < Z \leq \varepsilon_1 \\ Y_{PM} & \text{if } Z \leq \varepsilon_2 \end{cases}$$

In this equation, $\varepsilon_1$ and $\varepsilon_2$ may be arbitrary parameters, and the value of $\varepsilon_1$ may be greater than the value of $\varepsilon_2$. Further, the number of the arbitrary parameters provided may be greater than 2. If the value of similarity Z is greater than the value of $\varepsilon_1$, $Y_{NPM}$ may be used as the optimum algorithm. If the value of similarity Z is less than or equal to the value of $\varepsilon_2$, $Y_{PM}$ may be used as the optimum algorithm. If the value of similarity Z is greater than the value of $\varepsilon_2$ and less than or equal to $\varepsilon_1$, a combination of $Y_{NPM}$ and $Y_{PM}$ may be the optimum algorithm. That is, the optimum recovery algorithm may be configured as a set of at least one recovery algorithm combined according to a plurality of cases obtained by comparing the values of a plurality of preset parameters and the value of similarity Z.

According to an embodiment of the present disclosure, as the number of arbitrary parameters increases, the optimum recovery algorithm may be configured as a set of a plurality of recovery algorithms combined according to a larger number of cases. Accordingly, as an optimum recovery algorithm set is generated according to a larger number of cases, reliability of the process of restoring a fault signal may be improved.

FIG. 6 is a flowchart illustrating a fault signal recovery method according to an embodiment of the present disclosure. For simplicity, redundant description will be omitted.

Referring to FIG. 6, the data processor may generate a signal subset U* and a first learning signal subset X* by removing some tags including a fault signal from the signal set U including the some tags and the learning signal set X including learning data for recovery. The data processor may additionally generate a second learning signal subset Xs including only signals corresponding to some tags in the learning signal group X. The signals included in the first learning signal subset X* and the second learning signal subset Xs may all be normal signals (S110).

The modeling unit may extract feature information F from the first learning signal subset X* and output recovery information P on a plurality of recovery models that may be used for fault signal recovery. In this operation, the modeling unit may extract the feature information F using only data of one specific tag, or may extract the feature information F by combining the signals for all the tags included in the signal subset X* or the signals for some tags. In addition, the modeling unit may generate the recovery information P on a plurality of recovery models that may be used for fault signal recovery, based on the feature information F, the first learning signal subset X*, and the second learning signal subset Xs (S120).

Thereafter, the recovery unit may generate recovery algorithms based on the signal subset U*, the first learning signal subset X*, the feature information F, and the recovery information P. Each of the recovery algorithms may be a combination of the recovery information P and a corresponding algorithm based on the feature information F (S130).

The recovery unit may generate an optimum algorithm set by combining the recovery algorithms based on similarity Z. The optimum recovery algorithm set may be generated by combining recovery algorithms according to a plurality of cases obtained by comparing the values of a plurality of preset parameters and the value of similarity Z. The optimum algorithm set with application of similarity Z has been described earlier in detail (S140).

Normal signals for signals of some tags including a fault signal may be estimated through the optimum algorithm set. That is, the fault signals may be restored to the normal signals (S150).

FIG. 7 shows a result of simulation obtained on the assumption of recovery of corresponding sensor data in a situation where sensor data #2, #14, and #15 out of 15 sensor (tag) data have not been acquired.

Referring to FIG. 7, according to the fault signal recovery method of the present disclosure, recovery performance may be enhanced. In order to verify superiority of the present disclosure, the VSN (Virtual Signal Generation) function built in GE's SmartSignal, a method of recovering a signal using the general k-NN-based technique and the method proposed in the present disclosure are compared with each other in terms of performance through simulation.

<Simulation 1>

In the first simulation, it is assumed that the sensor data is recovered when sensor data #2, #14 and #15 out of 15 sensor (tag) data have not been acquired. Table 1 shows the results of this simulation. The performance indicator employed herein is represented by the accuracy and the number of fault signals. The accuracy indicates how accurately the signals are recovered. The number of fault signals indicates the number of signals that are not accurately recovered. 3% of the maximum value of the corresponding sensor data is calculated to set a reference value for determining whether or not recovery is accurate. When an estimated value of a signal recovered based on the reference value falls within a reference value range of the actual value, it is determined the recovery is accurate.

TABLE 1

| | | Performance | |
|---|---|---|---|
| | Core technique | Accuracy | Number of fault signals |
| the present disclosure | Ensemble learning | 98.3% | 52 (11.4%) |
| GE | VBM | 84.7% | 458 (100%) |
| Conventional technique | k-NN | 81.3% | 561 (125%) |

The accuracy is 84.7% for GE and 81.3% for conventional k-NN, whereas the method proposed in the present disclosure shows the accuracy of 98.3%. Therefore, it can be seen that the performance of the method proposed in the present disclosure is excellent. In addition, the number of inaccurately recovered signals is 458 for GE and 561 for the conventional k-NN, whereas the number of inaccurately recovered signals according to the method proposed in the present disclosure is 52, which is 11.4% of the number of the corresponding signals for GE.

FIG. 8 is a diagram showing the accuracy of recovery when the number of signals (tags) to be recovered increases to 1, 4, 7, and 10, respectively, and FIG. 9 is a diagram showing the number of fault signals remaining even after the recovery operation when the number of signals (tags) to be recovered increases to 1, 4, 7, and 10.

<Simulation 2>

In FIGS. 8 and 9, the number of sensor data to be recovered is increased one by one, and it is checked how the recovery performance changes according to increase in the number of sensor data to be recovered. Increase in the number of signals to be recovered means that the information data required for recovery is reduced, and thus generally lowers recovery performance. However, even in this situation, it is necessary to maximize the recovery performance in order to secure good-quality learning data.

Table 2 shows changes in recovery performance when the number of signals (tags) to be recovered increases to 1, 4, 7, and 10.

TABLE 2

| | | 1 | 4 | 7 | 10 |
|---|---|---|---|---|---|
| Accuracy | the present disclosure | 98.8% | 97.9% | 89.9% | 76.0% |
| | GE | 95.3% | 82.9% | 67.9% | 60.7 |
| | Conventional k-NN | 93.7% | 79.1% | 66.6% | 59.3% |
| Number of fault signals | the present disclosure | 12 | 84 | 715 | 2402 |
| | GE | 47 | 684 | 2244 | 3927 |
| | Conventional k-NN | 63 | 836 | 2335 | 4066 |

In the case of FIG. 8, when the number of recovered tags is 1, the accuracy obtained with the method proposed in the present disclosure, which is 98.8%, is not significantly different from the accuracy obtained with the technique of GE, which is 95.3%. However, when the number of tags to be recovered increases to 4, it can be seen that the method proposed in the present disclosure exhibits the accuracy of 97.9%, which is not much different from when the number of tags to be recovered is 1, whereas the performance of the GE technique is greatly decreased to 82.9%. When the number of recovered tags is 7/10, the method proposed in the present disclosure and the method proposed by GE have performances of 82.9%/76.0% and 67.9%/60.7%, respectively. As can be seen from these results, as the number of tags to be recovered increases, the number of pieces of information required for recovery may decrease, and accordingly performance degradation is unavoidable. It can be seen that the method proposed in the present disclosure does not undergo significant performance degradation, while the technique of GE does undergo significant performance degradation.

In the case of FIG. 9, with the technique of GE, as the number of tags to be recovered increases to 1, 4, 7 and 10, the number of fault signals that are not accurately recovered increases to 47, 684, 2244 and 3927. With the method proposed in the present disclosure, it can be seen that the number of fault signals that are not accurately recovered increases to 12, 84, 715 and 2402, which is a significantly small increase compared to the case of GE. That is, it can be seen that signals can be recovered very accurately with the method of the present disclosure rather than with the methods of other companies.

As is apparent from the above description, in a method for restoring a fault signal through machine learning according to embodiments of the present disclosure, a fault signal may be restored to a normal signal with high accuracy. Thereby, highly reliable learning data may be generated and accuracy of failure prediction may be improved based thereon.

According to embodiments of the present disclosure, recovery algorithms may be combined using a parameter related to similarity, thereby improving reliability of fault signal recovery. In addition, a plurality of cases may be set according to the relationship between parameter Z related to similarity and arbitrary parameters and an optimum recovery algorithm may be generated by combining different recovery algorithms according to the plurality of cases, thereby improving reliability of fault signal recovery.

Although exemplary embodiments of the present disclosure have been described with reference to the accompanying drawings, it will be apparent to those skilled in the art that the present disclosure can be embodied in other specific forms without departing from the spirit and essential characteristics of the disclosure. It is therefore to be understood that the above-described embodiments are illustrative and not restrictive in all aspects.

What is claimed is:

1. A system for restoring a fault signal in a plant, the system comprising:
a data processor receiving from the plant a learning signal set X including only tags of normal signals, a signal set U comprising a plurality of tags and including a fault signal, and an input S including information on a tag to be recovered, the data processor configured to
generate a signal subset U* by removing specific tags from the signal set U, the specific tags constituting a first tag group,
generate a first learning signal subset X* by removing tags of a second tag group from the learning signal set X such that the first learning signal subset X* contains only signals for tags other than the first tag group, the tags of the second tag group disposed at positions corresponding to the specific tags of the first tag group, and
process the learning signal set X to generate a second learning signal subset Xs containing only signals for the first tag group;
a modeling unit receiving the first learning signal subset X* and the second learning signal subset Xs from the data processor, modeling unit configured to
extract feature information F from the first learning signal subset X*, and
generate recovery information P on a plurality of recovery models usable for restoring the fault signal, the recovery information P generated based on the first learning signal subset X*, the second learning signal subset Xs, and the feature information F; and
a recovery unit receiving the signal subset U*, the second learning signal subset Xs, and the first learning signal subset X* from the data processor and receiving the feature information F and the recovery information P from the modeling unit, the recovery unit configured to recover normal signals for the first tag group by generating an optimum recovery algorithm, the optimum recovery algorithm generated based on
the signal subset U*, the second learning signal subset Xs, and the first learning signal subset X* received from the data processor,
the feature information F and the recovery information P received from the modeling unit, and
a degree of similarity Z between the signal subset U* and the first learning signal subset X*, wherein the signal subset U* and the first learning signal subset X* are configured as n×m matrices, and wherein the similarity Z is defined as:

$$\zeta_j = 1 - \frac{\sum_{i=1}^{n-ns}\left|\frac{X_{i,j}^* - U_i^*}{X_{i,j}^* + \alpha}\right|}{n - ns}, \quad j = 1, 2, \ldots, m, \text{ and}$$

$$Z = \max(\zeta_1, \ldots \zeta_m),$$

where α is a positive value and ns is the number of tags to be recovered.

2. The system according to claim 1, wherein the recovery unit comprises:
a model selector configured to select at least one recovery algorithm based on the signal subset U*, the first learning signal subset X*, the feature information F, and the recovery information P;
a similarity determiner configured to derive the similarity Z between the signal subset U* and the first learning signal subset X*; and
a recovery algorithm generator configured to generate the optimum recovery algorithm by applying the similarity Z to the at least one recovery algorithm.

3. The system according to claim 2, wherein the similarity determiner determines that the signal subset U* and the first learning signal subset X* are more similar to each other as a value of the similarity Z increases.

4. The system according to claim 2,
wherein the at least one recovery algorithm comprises a plurality of recovery algorithms each formed by combining at least one algorithm model and at least one recovery model of the plurality of recovery models,
wherein the at least one algorithm model or the at least one recovery model applied for any one recovery algorithm of the plurality of recovery algorithms is different from models applied for the other recovery algorithms of the plurality of recovery algorithms.

5. The system according to claim 4, wherein the recovery algorithm generator generates the optimum recovery algorithm by combining the plurality of recovery algorithms according to a value of the similarity Z.

6. The system according to claim 4, wherein the optimum recovery algorithm is configured as an optimum recovery algorithm set Y defined as $$Y = \begin{cases} Y_{NPM} & \text{if } Z > \varepsilon_1 \\ (1-\varepsilon_1) \times Y_{NPM} + \varepsilon_1 Y_{PM} & \text{if } \varepsilon_2 < Z \le \varepsilon_1 \\ Y_{PM} & \text{if } Z \le \varepsilon_2 \end{cases}$$

where $\varepsilon_1$ and $\varepsilon_2$ are arbitrary parameter values such that $\varepsilon_1$ is greater than $\varepsilon_2$, $Y_{NPM}$ is a nonparametric model-based recovery algorithm, and $Y_{PM}$ is a parametric model-based recovery algorithm.

7. The system according to claim 4, wherein the optimum recovery algorithm is configured as an optimum recovery algorithm set Y generated by combining the plurality of recovery algorithms according to respective comparisons between a value of the similarity Z and a plurality of arbitrary parameter values.

8. The system according to claim 7, wherein the optimum recovery algorithm set Y includes at least one of a recovery algorithm using a parametric model and a recovery algorithm using a nonparametric model in each of the respective comparisons.

9. The system according to claim 1,
wherein the at least one recovery algorithm comprises a plurality of recovery algorithms each formed by combining at least one algorithm model and at least one recovery model,
wherein the optimum recovery algorithm is configured as an optimum recovery algorithm set Y formed by combining the plurality of recovery algorithms according to respective comparisons between a value of the similarity Z and a plurality of arbitrary parameter values, and
wherein the recovery unit comprises an ensemble learning unit configured to extract the plurality of recovery algorithms and to generate the optimum recovery algorithm set Y by estimating an optimum recovery value based on recovery values estimated through the plurality of recovery algorithms and the similarity Z.

10. An ensemble learning unit of a system for restoring a fault signal in a plant, the system comprising a data processor receiving from the plant a learning signal set X including only tags of normal signals, a signal set U comprising a plurality of tags and including a fault signal, and an input S including information on a tag to be recovered; a modeling unit receiving the first learning signal subset X* and the second learning signal subset Xs from the data processor; and a recovery unit receiving the signal subset U*, the second learning signal subset Xs, and the first learning signal subset X* from the data processor and receiving the feature information F and the recovery information P from the modeling unit, the ensemble learning unit comprising:
a model selector configured to select at least one recovery algorithm based on the signal subset U*, the first learning signal subset X*, the second learning signal subset Xs, the feature information F, and the recovery information P;
a similarity determiner configured to derive a similarity Z between the signal subset U* and the first learning signal subset X*; and
a recovery algorithm generator configured to generate an optimum recovery algorithm by applying the similarity Z to the at least one recovery algorithm, wherein the optimum recovery algorithm is configured as an optimum recovery algorithm set Y defined as $$Y = \begin{cases} Y_{NPM} & \text{if } Z > \varepsilon_1 \\ (1-\varepsilon_1) \times Y_{NPM} + \varepsilon_1 Y_{PM} & \text{if } \varepsilon_2 < Z \le \varepsilon_1 \\ Y_{PM} & \text{if } Z \le \varepsilon_2 \end{cases}$$

where $\varepsilon_1$ and $\varepsilon_2$ are arbitrary parameter values such that $\varepsilon_1$ is greater than $\varepsilon_2$, $Y_{NPM}$ is a nonparametric model-based recovery algorithm, and $Y_{PM}$ is a parametric model-based recovery algorithm.

11. The ensemble learning unit according to claim 10,
wherein the at least one recovery algorithm comprises a plurality of recovery algorithms each formed by combining at least one algorithm model and at least one recovery model,
wherein the at least one algorithm model or the at least one recovery model applied for any one recovery algorithm of the plurality of recovery algorithms is different from models applied for the other recovery algorithms of the plurality of recovery algorithms.

12. The ensemble learning unit according to claim 10, wherein the recovery algorithm generator generates the optimum recovery algorithm by combining the plurality of recovery algorithms according to a value of the similarity Z.

13. The ensemble learning unit according to claim 10,
wherein the optimum recovery algorithm is configured as an optimum recovery algorithm set Y generated by combining the plurality of recovery algorithms according to respective comparisons between a value of the similarity Z and a plurality of arbitrary parameter values, and
wherein the optimum recovery algorithm set Y includes at least one of a recovery algorithm using a parametric model and a recovery algorithm using a nonparametric model in each of the respective comparisons.

14. A method for restoring a fault signal in a plant, the method comprising:
receiving from the plant a learning signal set X including only tags of normal signals, a signal set U comprising a plurality of tags and including a fault signal, and an input S including information on a tag to be recovered;
generating a signal subset U* by removing specific tags from the signal set U, the specific tags constituting a first tag group;
generating a first learning signal subset X* by removing tags of a second tag group from the learning signal set X such that the first learning signal subset X* contains only signals for tags other than the first tag group, the tags of the second tag group disposed at positions corresponding to the specific tags of the first tag group;
extracting feature information F from the first learning signal subset X*;
generating recovery information P on a plurality of recovery models usable for restoring the fault signal, the recovery information P generated based on the first learning signal subset X*, and the feature information F;
generating a plurality of recovery algorithms based on the signal subset U*, the first learning signal subset X*, the second learning signal subset Xs, the feature information F, and the recovery information P;
generating an optimum recovery algorithm set Y by combining the plurality of recovery algorithms a degree of similarity Z between the signal subset U* and the first learning signal subset X* and using the optimum recovery algorithm set Y to estimate and recover normal signals for the specific tags of the first tag group, wherein the optimum recovery algorithm set Y is defined as $$Y = \begin{cases} Y_{NPM} & f\ Z > \varepsilon_1 \\ (1-\varepsilon_1) \times Y_{NPM} + \varepsilon_1 Y_{PM} & f\ \varepsilon_2 < Z \le \varepsilon_1 \\ Y_{PM} & f\ Z \le \varepsilon_2 \end{cases}$$

where $\varepsilon_1$ and $\varepsilon_2$ are arbitrary parameter values such that $\varepsilon_1$ is greater than $\varepsilon_2$, $Y_{NPM}$ is a nonparametric model-based recovery algorithm, and $Y_{PM}$ is a parametric model-based recovery algorithm.

15. The method according to claim 14, wherein the optimum recovery algorithm set Y is generated by combining the plurality of recovery algorithms according to respective comparisons between a value of the similarity Z and a plurality of arbitrary parameter values.

16. The method according to claim 15, wherein the optimum recovery algorithm set Y includes at least one of a recovery algorithm using a parametric model and a recovery algorithm using a nonparametric model in each of the respective comparisons.

17. The method according to claim 14, wherein the signal subset U* and the first learning signal subset X* are configured as n×m matrices, and wherein the similarity Z is defined as:

$$\zeta_j = 1 - \frac{\sum_{i=1}^{n-ns} \left| \frac{X^*_{i,j} - U^*_i}{X^*_{i,j} + \alpha} \right|}{n - ns}, \quad j = 1, 2, \ldots, m, \text{ and}$$

$$Z = \max(\zeta_1, \ldots \zeta_m),$$

where $\alpha$ is a very small positive value and ns is the number of tags to be recovered.

18. The method according to claim 14, further comprising:

processing the learning signal set X to generate a second learning signal subset Xs containing only signals for the first tag group, wherein the recovery information P is generated based on the first learning signal subset X*, the second learning signal subset Xs, and the feature information F.

\* \* \* \* \*